(12) United States Patent
Gavrilescu et al.

(10) Patent No.: US 7,711,800 B2
(45) Date of Patent: May 4, 2010

(54) NETWORK CONNECTIVITY DETERMINATION

(75) Inventors: Alexandru Gavrilescu, Redmond, WA (US); Tin Qian, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1069 days.

(21) Appl. No.: 11/345,189

(22) Filed: Jan. 31, 2006

(65) Prior Publication Data

US 2007/0177499 A1    Aug. 2, 2007

(51) Int. Cl.
*G06F 15/16* (2006.01)
(52) U.S. Cl. .................... 709/219; 709/217; 709/218
(58) Field of Classification Search ................ 706/201, 706/202, 217, 223, 231; 370/252
See application file for complete search history.

(56) References Cited

U.S. PATENT DOCUMENTS

| | | | | |
|---|---|---|---|---|
| 5,982,753 A * | 11/1999 | Pendleton et al. | ........... | 370/252 |
| 6,711,137 B1 * | 3/2004 | Klassen et al. | ............. | 370/252 |
| 6,934,290 B2 * | 8/2005 | Story | ....................... | 370/395.1 |
| 6,938,080 B1 * | 8/2005 | Kahveci et al. | ............. | 709/223 |
| 7,080,141 B1 * | 7/2006 | Baekelmans et al. | ........ | 709/224 |
| 2002/0147837 A1 * | 10/2002 | Heller | ......................... | 709/238 |
| 2003/0018930 A1 * | 1/2003 | Mora et al. | .................... | 714/42 |
| 2003/0028614 A1 * | 2/2003 | Jeon | ........................... | 709/217 |
| 2003/0177213 A1 * | 9/2003 | Wallace et al. | .............. | 709/223 |
| 2003/0217173 A1 * | 11/2003 | Butt et al. | .................... | 709/237 |
| 2005/0091355 A1 * | 4/2005 | Keohane et al. | ............. | 709/223 |
| 2005/0283527 A1 * | 12/2005 | Corrado et al. | ............. | 709/224 |
| 2006/0153200 A1 * | 7/2006 | Filsfils et al. | .......... | 370/395.31 |
| 2006/0182036 A1 * | 8/2006 | Sasagawa et al. | ........... | 370/242 |
| 2006/0242268 A1 * | 10/2006 | Omernick et al. | ........... | 709/219 |

* cited by examiner

*Primary Examiner*—Quang N. Nguyen
*Assistant Examiner*—Razu A Miah
(74) *Attorney, Agent, or Firm*—Marshall, Gerstein & Borun LLP

(57) ABSTRACT

The present invention provides a method by which the connectivity status of network connections on a PC is determined in real-time by passively reviewing packet information from the TCP/IP stack. To achieve high accuracy of the connectivity status determination, the method involves the determination of the edge of a local network. In cases where little or no network traffic is observed on the network, scalable active probing methods are designed to make accurate connectivity determination. Special considerations for network setups like networks with web proxy servers, NAT or edge firewalls are also included to improve the accuracy of the determination in those environments.

5 Claims, 13 Drawing Sheets

NETWORK CONNECTIVITY DETERMINATION

BACKGROUND

Today's network services are unable to report realtime health assessment of the Internet to the users that are meaningful to their daily tasks like web browsing, conferencing, etc. Moreover, when the Internet connectivity is broken, neither could they notify the users the disruption of internet connectivity in a timely manner nor could they provide useful diagnostics information to the users as to where the problem might be, whether it is with their local ISP network or the Internet backbone. In addition, because of this lack of support for determining the Internet connectivity, applications that rely on this information to be available readily and reliably often have to seek out other ad-hoc and un-reliable methods such as ping certain sites. Due to intrusive nature of those methods, it is prohibitively expensive in term of generated network traffic to deploy them in a large scale.

SUMMARY

The invention determines in real-time the connectivity status of network connections on a PC by passively reviewing packet information from the TCP/IP stack. To achieve high accuracy of the connectivity status determination it devises a novel method to discover the edge of the local network. In cases where little or no network traffic is observed on the network, scalable active probing methods are designed to make accurate connectivity determination. Special considerations for network setups like networks with web proxy servers, NAT or edge firewalls are also included to improve the accuracy of the determination in those environments.

DRAWINGS

Figure 3:
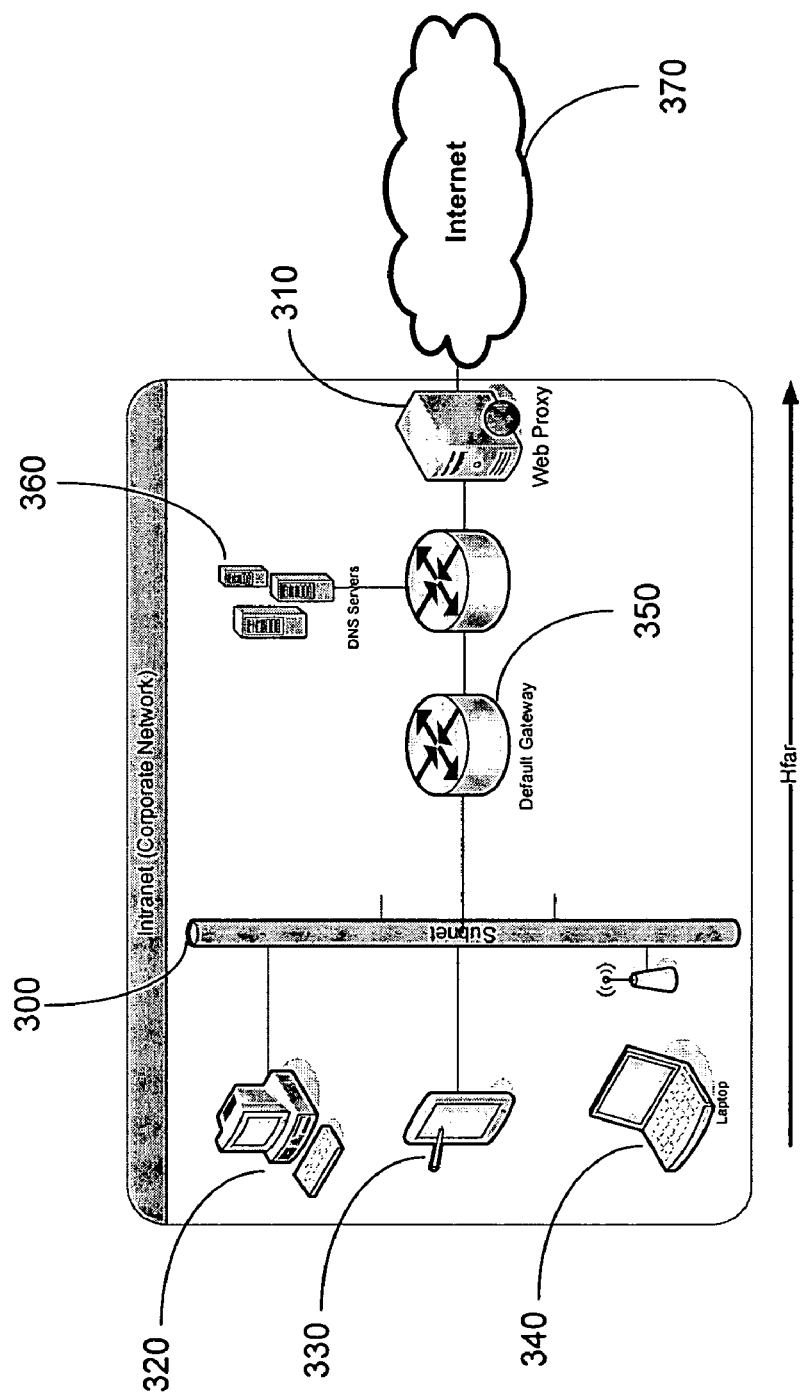
Figure 4:
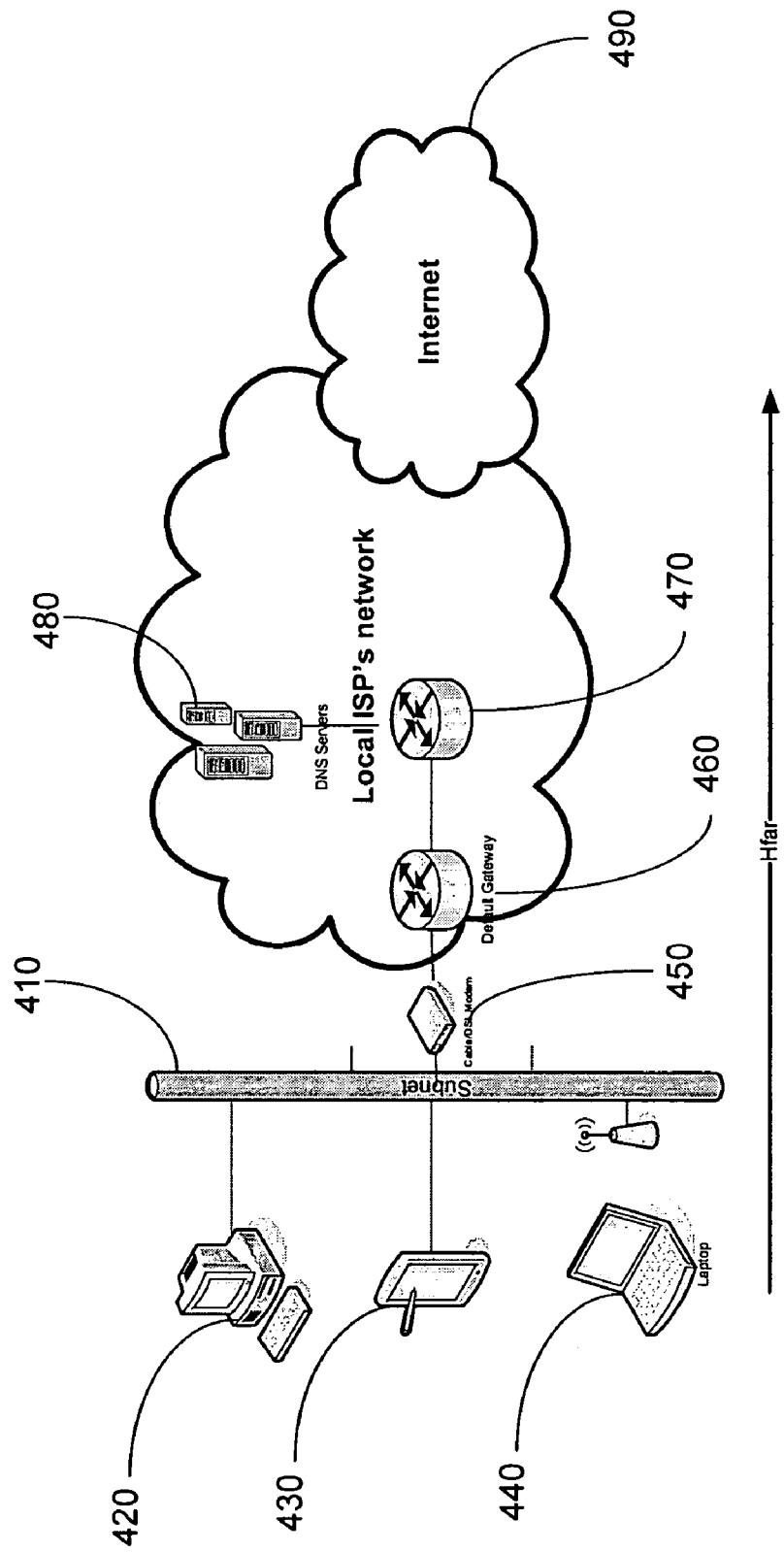
Figure 5:
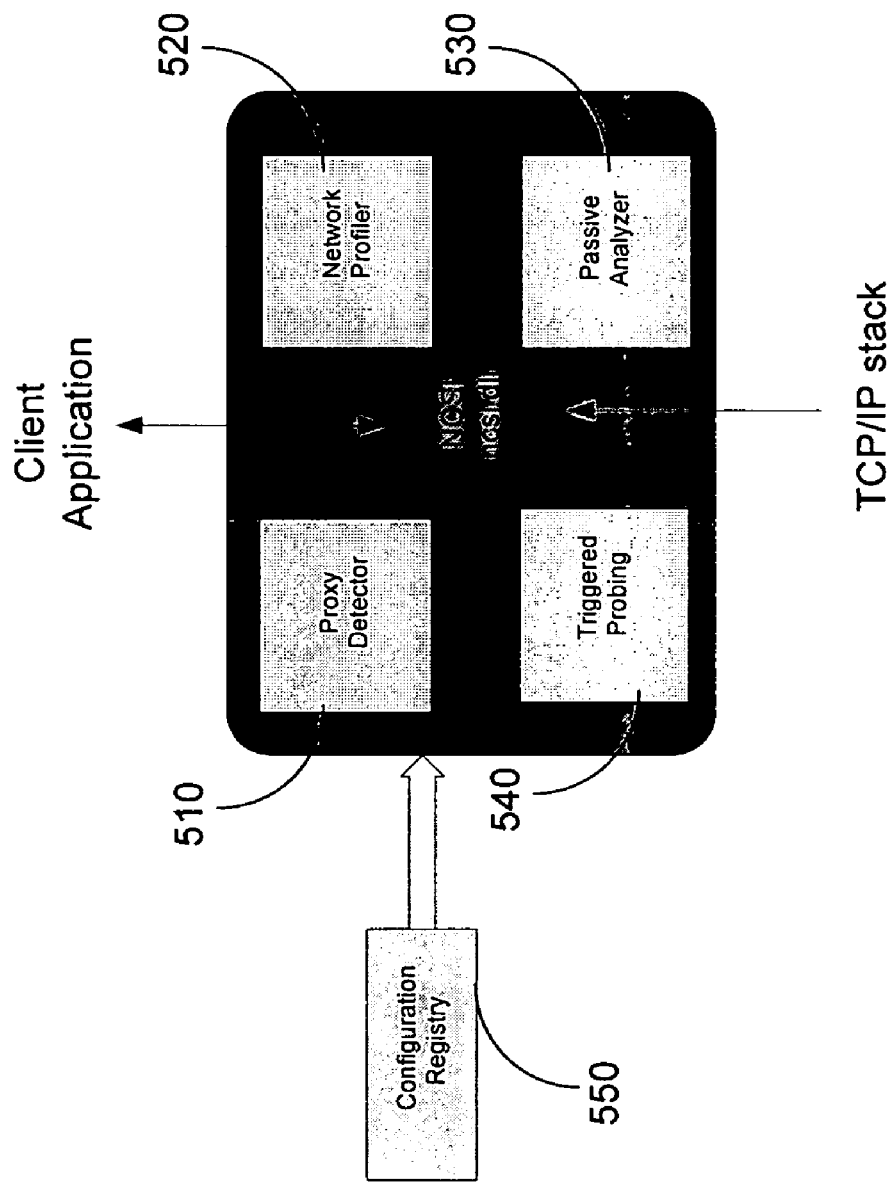
Figure 6:
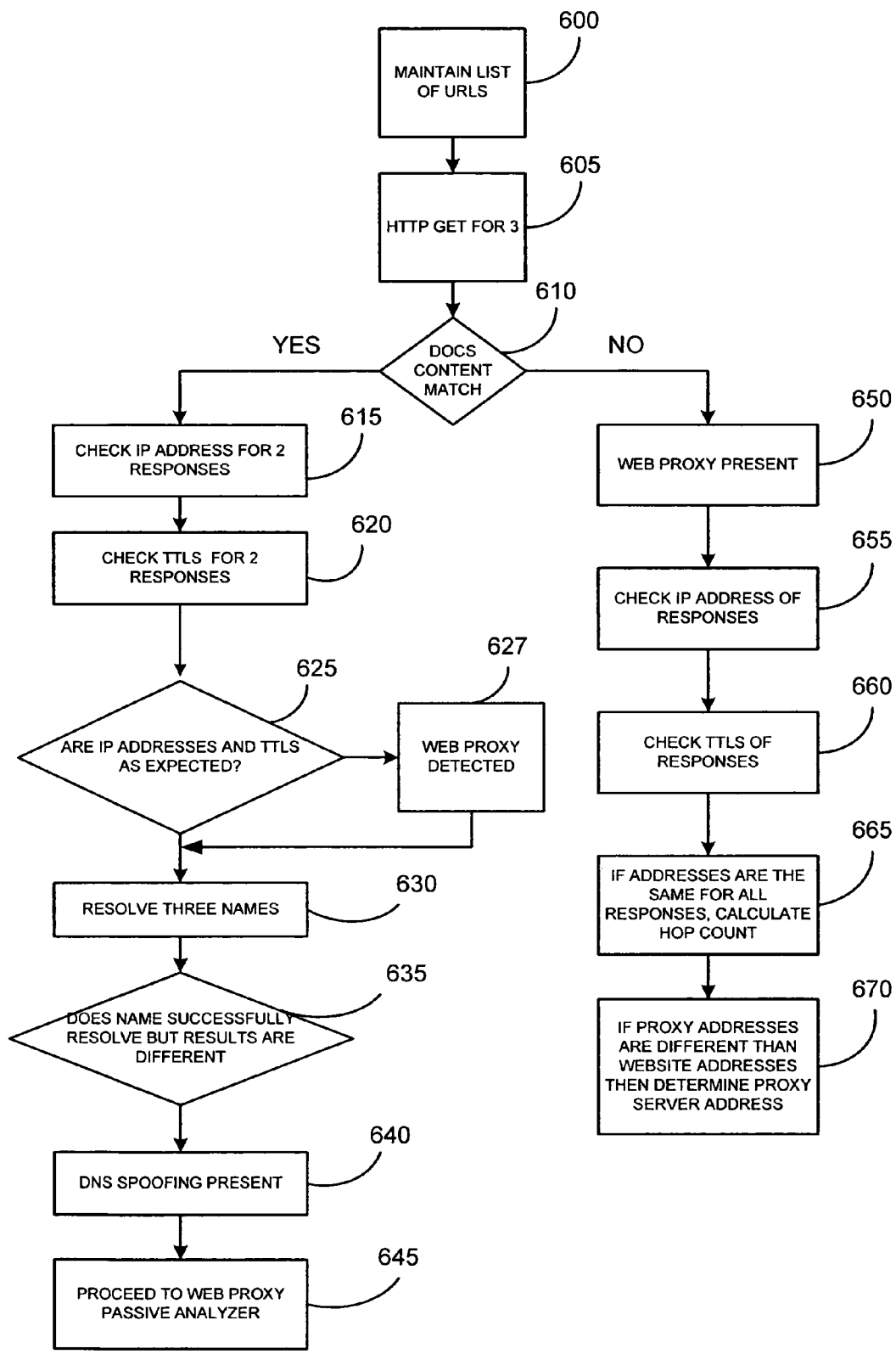
Figure 7:
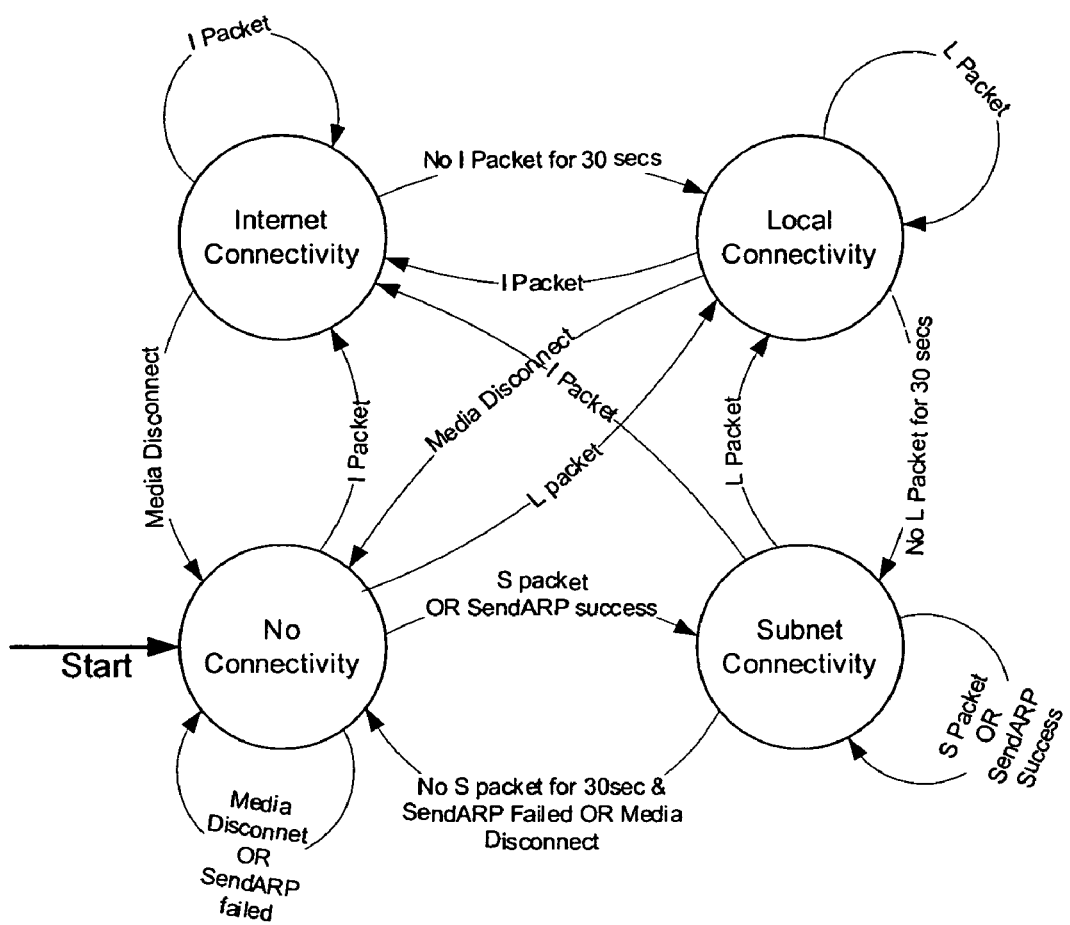
Figure 8:
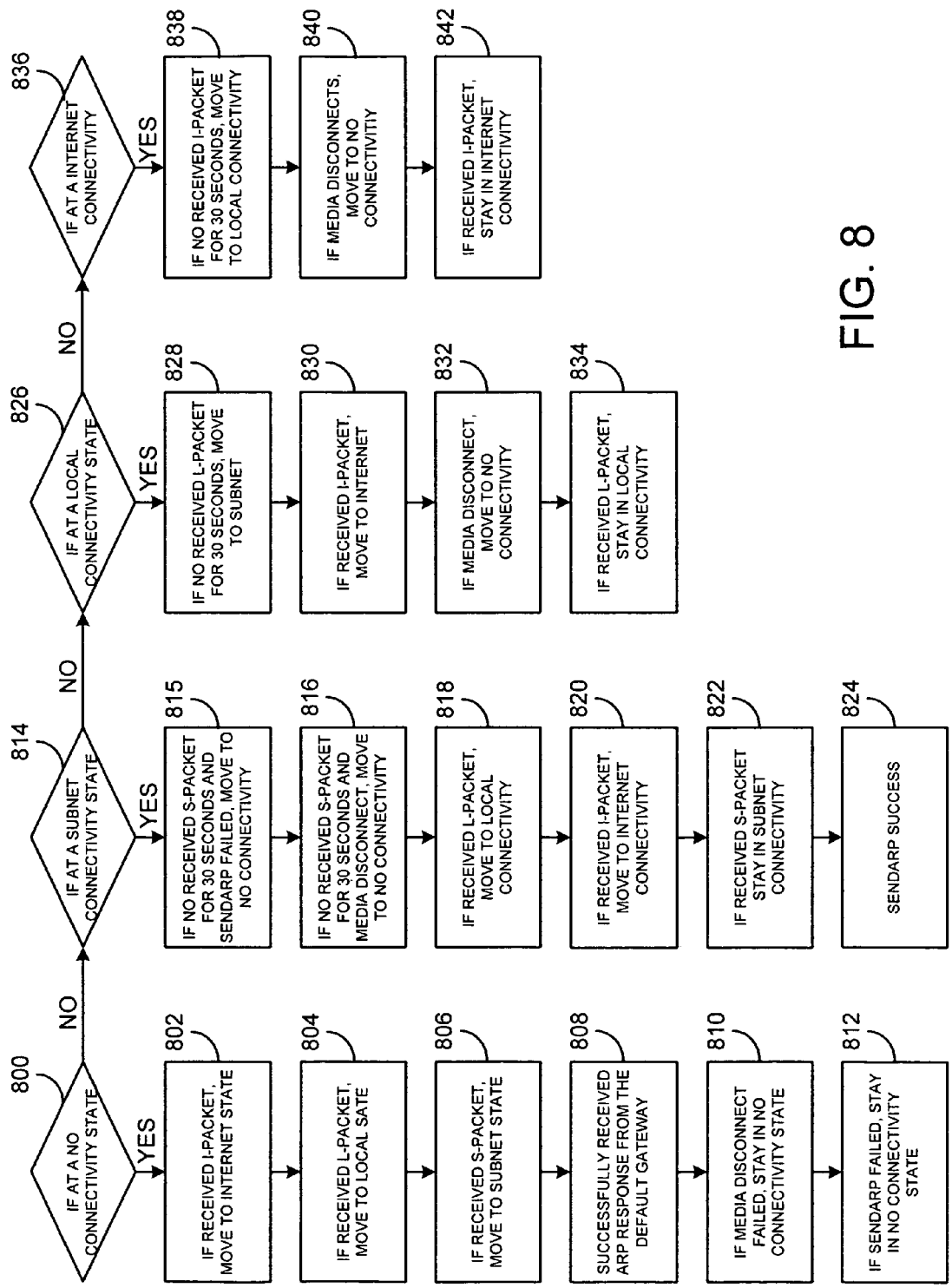
Figure 9:
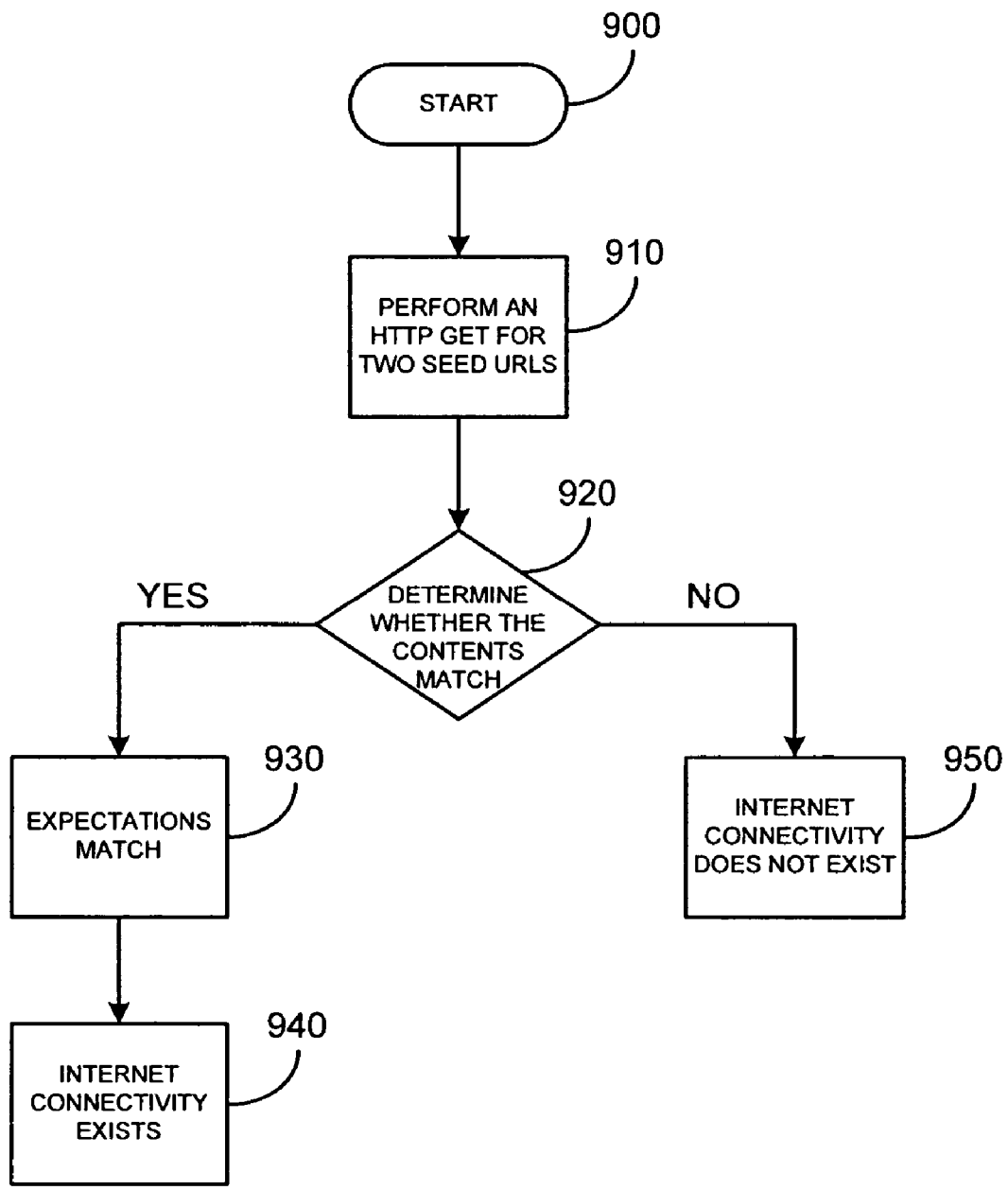
Figure 10:
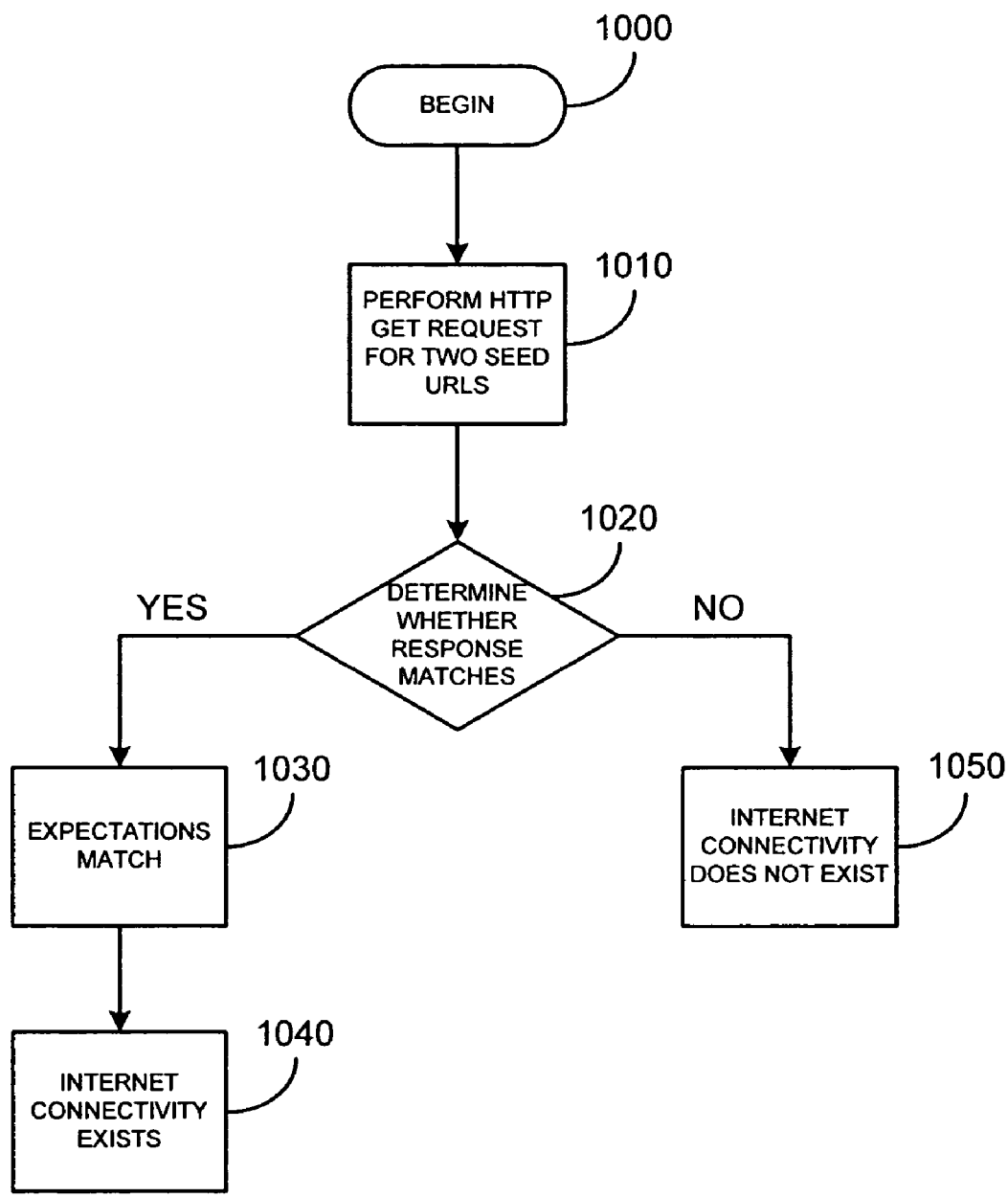
Figure 11:
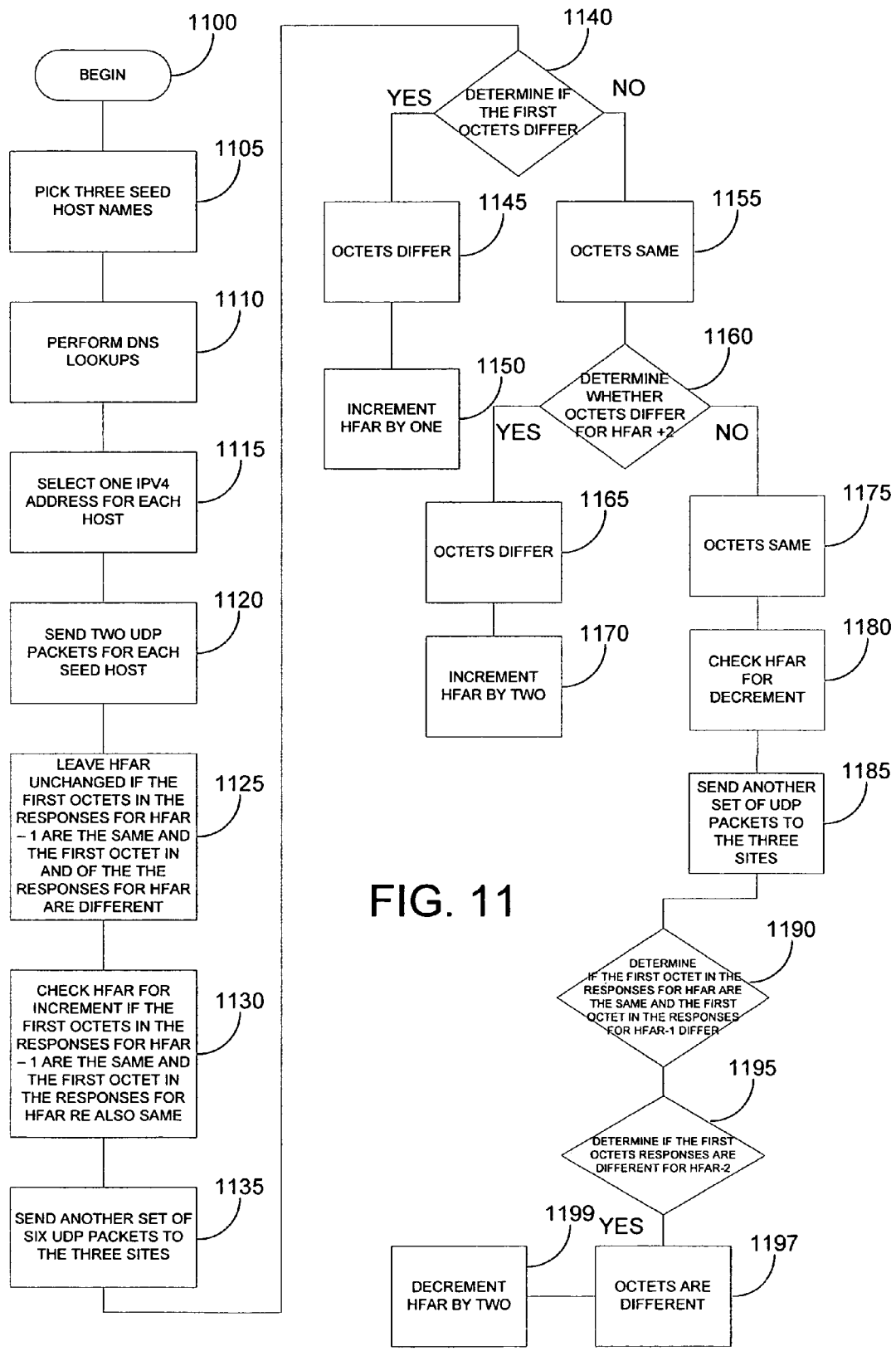
Figure 12:
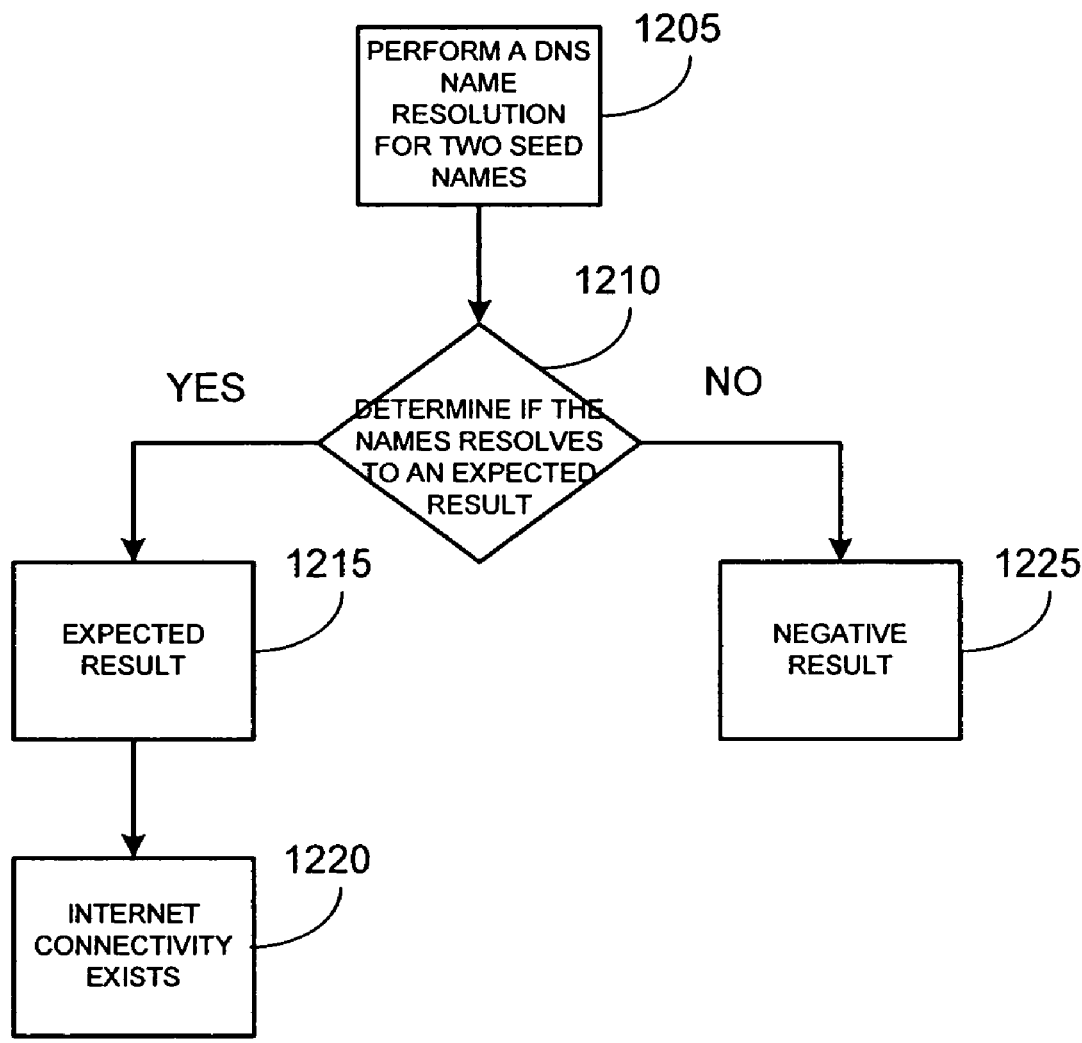

FIG. 3 may be an illustration of corporate internet access using a web proxy;

FIG. 4 may be an illustration of home internet access using an internet service provider ("ISP");

FIG. 5 is an illustration of the main software components that may be used to implement the method;

FIG. 6 may be an illustration of a method of web proxy detection and network profiling;

FIG. 7 may be an illustration of a passive network state analyzer;

FIG. 8 may be another illustration of a passive network state analyzer;

FIG. 9 may be an illustration of triggered web probing via HTTP;

FIG. 10 may be an illustration of direct web probing via HTTP;

FIG. 11 may be an illustration of network profiling;

FIG. 12 may be an illustration of triggered DNS probing; and

Figure 13:
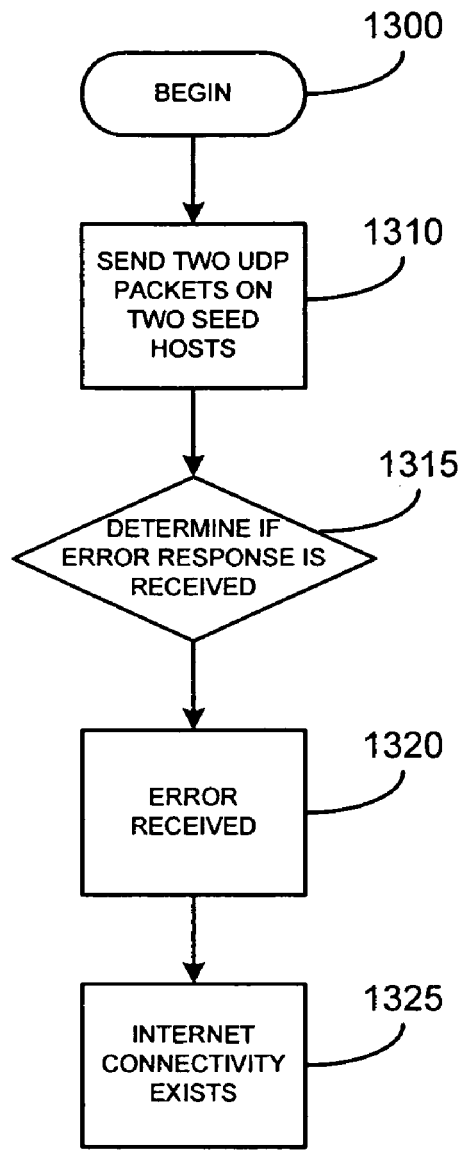

FIG. 13 may be an illustration of direct DNS probing.

DESCRIPTION

Although the following text sets forth a detailed description of numerous different embodiments, it should be understood that the legal scope of the description is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, if any term is given an express definition in this patent application, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. .sctn. 112, sixth paragraph.

Figure 1:
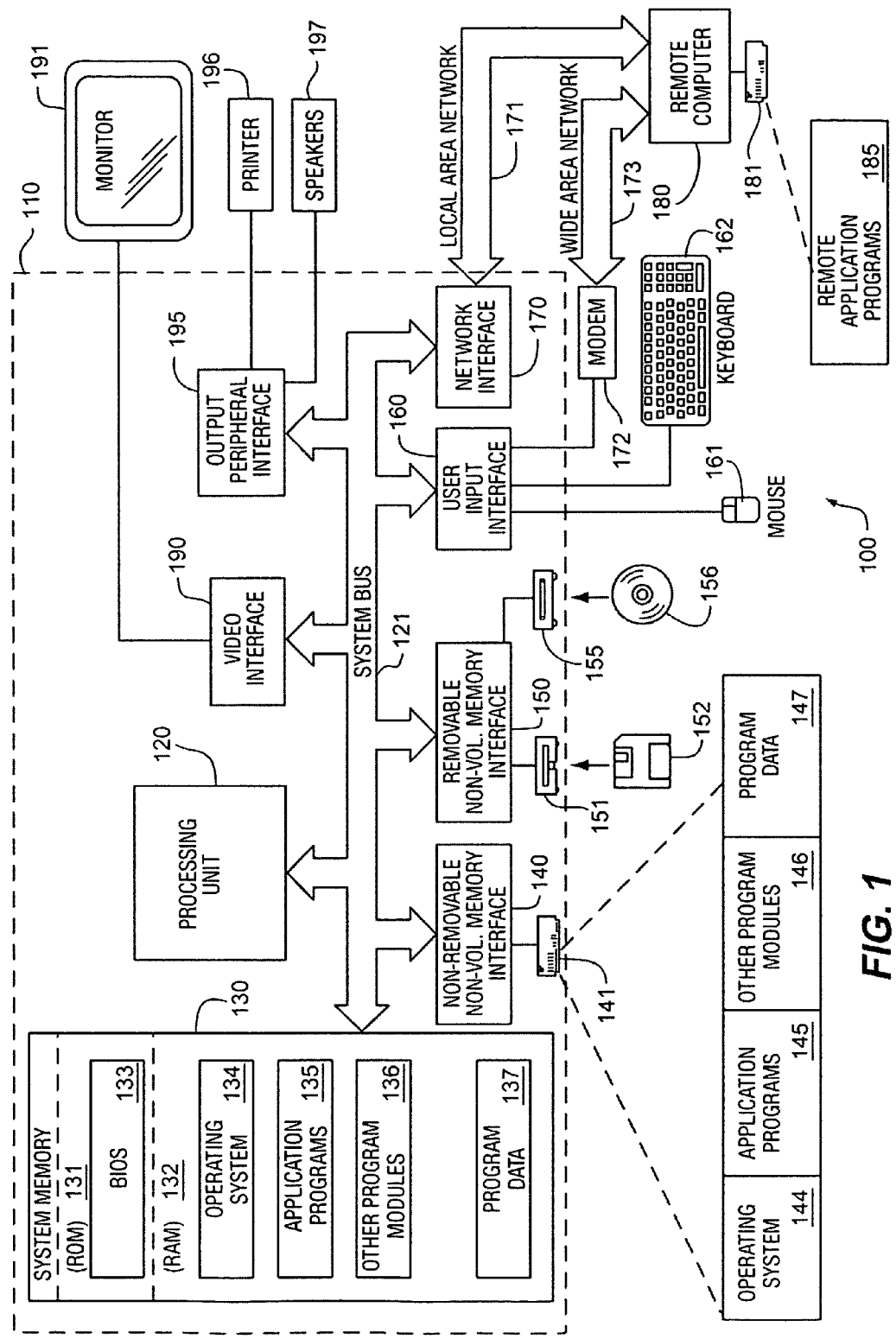
FIG. 1 is a block diagram of a computing system that may operate in accordance with the claims.

FIG. 1 illustrates an example of a suitable computing system environment 100 on which a system for the steps of the claimed method and apparatus may be implemented. The computing system environment 100 is only one example of a suitable computing environment and is not intended to suggest any limitation as to the scope of use or functionality of the method of apparatus of the claims. Neither should the computing environment 100 be interpreted as having any dependency or requirement relating to any one or combination of components illustrated in the exemplary operating environment 100.

The steps of the claimed method and apparatus are operational with numerous other general purpose or special purpose computing system environments or configurations. Examples of well known computing systems, environments, and/or configurations that may be suitable for use with the methods or apparatus of the claims include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The steps of the claimed method and apparatus may be described in the general context of computer-executable instructions, such as program modules, being executed by a computer. Generally, program modules include routines, programs, objects, components, data structures, etc. that perform particular tasks or implement particular abstract data types. The methods and apparatus may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the steps of the claimed method and apparatus includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Figure 2:
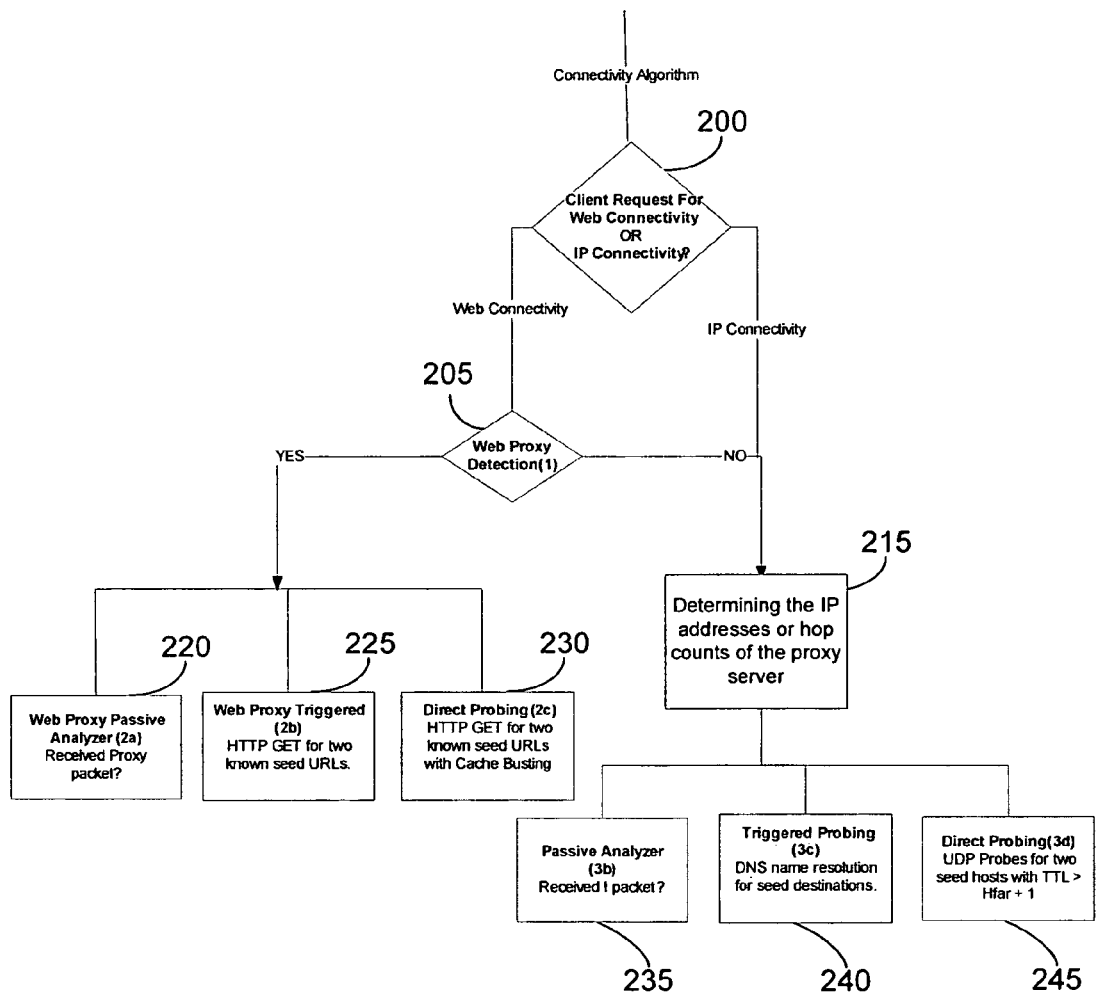
FIG. 2 is an illustration of a method for determining network connectivity.

FIG. 2 may be an illustration of a method for determining network connectivity. At block 200, the method may be called when an application wants to query the connectivity status. In general, there are two basic types of connectivity: web connectivity i.e. connectivity to web sites via HTTP and general IP connectivity. Block 200 checks which connectivity type the application is interested in and follows different paths in determining the connectivity status. If the application is interested in web connectivity and web proxies are detected at block 205, web proxy passive analyzer at block 220, active web probing at block 225 and 230 are used. Otherwise, general IP passive analyzer at block 235 and active DNS probing at block 240 and 245 are used instead.

FIG. 3 may be an illustration of corporate internet access using a web proxy 310. The corporation may have a subnet 300 which users access either through wired access such as in the case of desktop 320 or handheld 330 or through wireless access using a laptop 340 for example. The subnet 300 may use the default gateway 350 to access the internet and DNS servers. Web requests may be served from the web proxy 310 if the pages are in the proxy's cache, or if not, the request may be served from the internet 370.

FIG. 4 may be an illustration of home internet access using an internet service provider ("ISP"). The home may have a subnet 410 which users access either through wired access such as in the case of desktop 420 or handheld 430 or through wireless access using a laptop 440 for example. The subnet may use a modem to access a default gateway 460 inside the ISP's network 470. Also inside the ISP's network may be DNS servers 480. A request from the subnet 410 may reach the Internet 490 via the ISP network.

FIG. 5 may illustrate client applications that register for network connectivity status information. There may be four major pieces in the method which may be referred to as a network connectivity status indicator ("NCSI") shown in FIG. 5:

The Proxy Detector 510 may detect the presence of a web proxy or transparent proxy or DNS spoofing in the network connected to the PC.

The Network Profiler 520 may perform a lightweight profiling of the networks connected to the PC and stores the network metrics (e.g., Hfar, Hnear) in a cache. Profiling may be performed after a network-change notification is received from the TCP/IP stack.

The passive analyzer 530 may periodically query the TCP/IP stack for packets received from remote destinations, stores the network status, and informs client applications of changes to the network connectivity status.

The triggered probing 540 may be used when lack of network activity renders the Passive Analyzer 530 ineffective. The triggered probing 540 may be relied upon to perform lightweight probes to determine network connectivity status.

In addition, a list of twenty five seed host names, corresponding URLs, and IP addresses may be stored in a configuration store or registry 550.

Referring again to FIG. 2, for web connectivity, the presence of a Web Caching Proxy may be determined 205. In the absence of a web caching proxy, IP connectivity 210 may be used to indicate web connectivity. Both web and IP connectivity have the following three provisions for determining connectivity:

Passive Analyzer for passively determining the connectivity status;

Triggered Probing for determining the connectivity status on various triggering events such as Network Signature changes; address changes, default gateway changes, and Direct Probing for determining the connectivity status when applications need quick and correct connectivity information.

FIG. 6 may be an illustration of web proxy detection. At block 600, a list of twenty five seed URLs hosted on geographically spread local sites such as msn.dk, msn.be, msn.co.in, msn.co.jp, msn.co.kr, msn.co.za, msn.com.mx, msn.com.sg, msn.com.cn, msn.com.hk, msn.com.au, msn.com.br, msn.com.tw along with the IP addresses of the hosts may be maintained such as in registry 550.

The method may perform HTTP GETs for three seed URLs randomly chosen from the seed URL list 605. HTTP GET may fetch an HTTP URL. At block 610, the method may determine whether all the HTTP GETs responses match the expected content. If the determination at block 620 is yes, the method continues to block 615. If the content does not match, a proxy may be present and control may pass to block 650. Returning to block 615, the method may check for the IP addresses for two responses 620 and the TTLs for the two responses 625. The TTL may indicate the number of hops the packet traveled. For example, common fixed initial TTL values are 255, 128, 64 and 32 and the TTL may be reduced for each hop. By reviewing the received TTL to the most logical TTL start value, the number of hops the packet traveled may be determined. If the IP addresses and TTLs are the same as expected, the method may determine that a web proxy is present 627 and control may pass to block 630.

At block 630, the method may perform name resolutions for three names. The method may determine whether any name successfully resolves but the results are different from the expected result 635. If the determination is yes, the presence of DNS spoofing may be detected 640, as is prevalent at hotels, airports, or libraries and web connectivity may not be present 645 and control may pass to the web proxy passive analyzer.

Returning to block 650, the method may determine that a web proxy is present. At block 655, the method may check the IP address of responses and at block 660, the method may check the TTLs of the responses. At block 665, if the IP addresses are the same for all response, then the method may calculate the hop count for the proxy server. At block 670, if the proxy addresses are different that the website addresses, then the method may determine the proxy server IP address.

Web Proxy Passive Analyzer

Packets may be monitored both actively and passively. By monitoring passively, no impact will be made to the servers and the network infrastructure. Thus this makes it possible to have a large scale deployment. In a few rare situations, active probing may be necessary to improve the accuracy of network connectivity determination. FIG. 7 may summarize the connectivity states maintained by a passive analyzer per interface. At a high level, the method will determine if packets have been received beyond certain limits, such as the limit of the connecting IPS (Hfar). Hfar may refer to the number of hops on a path to the edge of the ISP network. The edge of the ISP network may be identified by the first octet in the IP address of the intermediate routers changing. If the router is not beyond the ISP, the first octet of the IP address will be the same. If the router is beyond the ISP, the first octet of the IP address will be different. In a home environment, Hfar may commonly be five. In a corporate environment that employs proxy servers, Hfar may be the hops to the proxy server. Proxy servers may be detected from the list of the routers when all source routers are the same for requests with a TTL beyond a certain value, such as beyond Hfar hops. In one embodiment, Hfar may be set to a default value and Hfar may be adjusted to the hop count to the proxy server based on received packets. There are three types of packets:

I Packets: These packets arrive from an IPv4 source beyond Hfar, or from an IPv6 source outside the IPv6 site.

L Packets: These packets arrive from an IPv4 source outside the IPv4 subnet but before Hfar, or from an IPv6 source outside the IPv6 subnet but within the IPv6 site.

S Packets: These packets arrive from a source with the same subnet prefix.

FIG. 8 may be another illustration of the concepts of FIG. 7 in written form. The method may passively determine connect with states.

If at a no connectivity state 800:
move to internet state if received I-packet 802,
to local state if received L-packet 804,
to subnet state if received S packet 806 or successfully received address resolution protocol ("ARP") response from the default gateway 808, and
stay in no connectivity state if media disconnect 810 or SendARP failed 812 where SendARP sends an ARP request to obtain the physical address that corresponds to the specified destination IP address.

If at a subnet connectivity state 814:
move to no connectivity state if no received S packet for 30 seconds and SendARP failed 815 media disconnect 816,
move to local connectivity state if received L-packet 818,
move to internet connectivity state if received I packet 820, and
stay in subnet connectivity state if received S packet 822 or SendARP success 824.

If at a local connectivity state 826:
move to subnet connectivity state if no received L packet for 30 seconds 828,
move to internet connectivity state if received I packet 830,
move to no connectivity state if media disconnect 832, and
stay in local connectivity state if received L packet 834.

If at a internet connectivity state 836:
more to local connectivity state if no received I packet for 30 seconds 838,
move to no connectivity state if media disconnects 840, and
stay in internet connectivity state if received I packet 842.

If any client application has registered for network connectivity status notifications, the passive analyzer may periodically poll the TCP/IP stack every five seconds for the number of packets received from remote destinations. If a packet arrives from the Web cache proxy (referred to as Proxy packet), with a match of proxy IPs or TTLs, the presence of Web Internet connectivity is indicated. In the absence of a Proxy packet for 30 seconds, the arrival of I packets are relied upon to indicate Web Internet connectivity.

In the case of DNS spoofing, an HTTP GET for two seed URLs may be performed every minute until a content match occurs or no registered clients remain. If matching occurs, the method may proceed to Network Profiling 215 (FIG. 2).

Web Proxy Triggered Probing

FIG. 9 may illustrate a method of web proxy triggered probing. The method may begin at block 900. At block 910, the method may perform an HTTP GET for two seed URLs using seed host IP addresses. At block 920, the method may determine whether the contents of the response to the HTTP GET match expected results. If the expectations match 30, internet connectivity exists 940. If the expectations do not match 950, internet connectivity does not exist. Note the Response for the seed URLs is of very small size (e.g., two bytes) and would contain control header fields with max-age specified as 60 seconds and force-revalidation turned on.

Direct Web Probing

FIG. 10 may illustrate a method of direct web probing. The method may begin at block 1200. The method may perform HTTP GET requests for the two seed URLs using the host IPs with "no-cache" directive, i.e., bypass the Web proxy cache 1010. At block 1020, the method may determine whether a response is received with content matching the expected content. If the determination is yes 1030, block 1040 may indicate internet connectivity exists. If the determination is no, block 1050 may indicate internet connectivity does not exist.

Referring back to FIG. 2, if the method determines the request is for IP connectivity 210, the method may proceed to block 215 for Network Profiling which may involve determining Hfar. Network Profiling may be undertaken to refine Hfar characteristics of a network. Hfar may be set to a default value of Hfar (6) if profiling is disabled or not yet complete. Profiling may be triggered by event notifications from the TCP/IP stack when a new network is connected, determined by its subnet address and the MAC address of its default gateway. In order to prevent synchronized profiling, it is performed after waiting for a random time after the triggering event. In addition, the profiling information like Hfar and Hnear may be cached along with the network subnet address and the MAC address of its default gateway to reduce the frequency of profiling. A new profiling is necessary for the same network only if the last profile takes place more than a month ago.

Services that need Internet connectivity information before profiling may rely on Passive Analyzer 235 (which uses default Hfar value) or on Triggered Probings 240 for fresh connectivity information.

FIG. 11 may be an illustration of network profiling when IPv4 is present (i.e., except on an IPv6-only node). At block 1100, the method may begin. At block 1105, the method may pick three seed host names. At block 1110, the method may perform DNS lookups to obtain IPv4 addresses for the three seed host names. At block 1115, the method may select one IPv4 address for each host.

At block 1120, for each of the three seed hosts, the method may send two UDP (or TCP) packets with the following TTL 2-tuple <Hfar−1, Hfar> using the port designated port for traceroute, i.e., 33434.

The method may refine Hfar value for the network. The start value for Hfar may be 6. Selecting a default value of Hfar as 6 may allow it to be refined by +/−2, i.e., allowing it to take values between 4 and 8. Hfar normally ranges between 4 and 8.

At block 1125, for the three paths, if the first octets in the responses for Hfar−1 are the same and first octet in any of the responses for Hfar are different, the method may leave Hfar unchanged.

At block 1130, for the three paths, if the first octets in the responses for Hfar−1 are the same and first octet in the responses for Hfar are also same, the method may check Hfar for increment.

At block 1135, the method may send another set of six UDP packets with TTL tuple <Hfar+1, Hfar+2> to the three sites. At block 1140, the method may determine if for the three paths, the first octets in the responses for Hfar+1 differ. If the determination is yes 1145, the method may increment Hfar by one 1150. If the determination is no 1155 (the first octets do not differ), the method may determine whether the octets differ for Hfar+2 at block 1160. If the determination is yes 1165, Hfar may be incremented by two 1170.

If the determination is no 1175, for the three paths, if the first octets in the responses for Hfar−1 are the different, the method may check Hfar for decrement 1180. At block 1185, the method may send another set of six UDP packets with TTL tuple <Hfar−2, Hfar−1> to the three sites. At block 1190, the method may determine if for the three paths, the first octet in the responses for Hfar−2 are the same and the first octet in the responses for Hfar−1 differ. If the determination is yes, Hfar may be decremented by one. At block 1195, the method may determine whether if for the three paths, the first octets in the responses for Hfar-2 are different. The determination is yes 1197, Hfar may be decremented by two 1199.

IPv6

For IPv6 networks, site prefixes may be used in determining connectivity status. Site Prefixes are retrieved from stack query and arrival of a packet from a destination with different site prefix is used to indicate presence of internet connectivity. This may be a more accurate measure than Hfar because there can be destinations inside one's site/Intranet whose hop count is larger than Hfar.

IP Passive Analyzer

FIG. 7 may summarize the connectivity states maintained by a passive analyzer per interface. There are three types of packets:

I Packets: These packets arrive from an IPv4 source beyond Hfar, or from an IPv6 source outside the IPv6 site.
  L Packets: These packets arrive from an IPv4 source outside the IPv4 subnet but before Hfar, or from an IPv6 source outside the IPv6 subnet but within the IPv6 site.
  S Packets: These packets arrive from a source with the same subnet prefix.

Depending on the starting state, other states may be reached based on the packets received.

If at a no connectivity state 800:
  move to internet connectivity state if received I-packet 802,
  move to local connectivity state if received L-packet 804,
  move to subnet connectivity state if received S packet 806 or successfully received ARP response from the default gateway 808, and
  stay in no connectivity state if media disconnect 810 or SendARP failed 812

If at a subnet connectivity state 814:
  move to no connectivity state if no received S packet for 30 seconds and SendARP failed 815 media disconnect 816,
  move to local connectivity state if received L-packet 818,
  move to internet connectivity state if received I packet 820, and
  stay in subnet connectivity state if received S packet 822 or SendARP success 824

If at a local connectivity state 826:
  move to subnet connectivity state if no received L packet for 30 seconds 828,
  move to internet connectivity state if received I packet 830,
  move to no connectivity state if media disconnect 832, and
  stay in local connectivity state if received L packet 834

If at an internet connectivity state 836:
  more to local connectivity state if no received I packet for 30 seconds 838,
  move to no connectivity state if media disconnects 840, and
  stay in internet connectivity state if received I packet 842.

The Passive Analyzer may start when a client application subscribes for Internet connectivity status. Passive Analyzer is stopped when no client has subscribed for Internet connectivity information.

Triggered Probing

Triggered Probing 240 (FIG. 2) may be used when an application desires current determination of network connectivity status and the status could not be determined by the Passive Analyzer. FIG. 12 may be an illustration of triggered probing. The method may begin at block 1200 using DNS name resolution. At block 1205, the method may perform a DNS name resolution for two seed names (e.g., "ncsi.microsoft.com") with different authoritative DNS servers using a TTL of the DNS entries for these names of 60 seconds in the authoritative DNS servers. At block 1210, the method may determine if either of the names resolves to an expected result. If the determination is yes 1215, the method may determine internet connectivity exists. 1220. If the determination is negative 1225, the method may determine internet connectivity does not exist. The details of the actual names used, what record type is resolved, and the expected value is left open to a program designer.

Direct Probing

Direct probing 245 (FIG. 2) may also be used. FIG. 13 may be an illustration of direct probing. The method may begin at block 1300. At block 1310, the method may send two UDP packets destined to the traceroute port (33434) on two seed hosts with TTL larger than Hfar+1. The method may determine if an ICMP time-exceeded error or an Address/Port/Protocol unreachable error response is received 1315. If the determination is yes 1320, the method may determine internet connectivity exists 1325.

Connectivity status per interface may be maintained in an in-memory cache along with a time stamp. When multiple requests from applications arrive and the cache entry is within five seconds, the method may not perform probing and status from the cache may be returned.

Autodial

Network Profiler or Triggered Probing could trigger a dial-up connection if it is not already up when autodial is enabled. If autodial is enabled on local host or remote internet gateway device ("IGD"), Passive Analyzer will gather the knowledge of previous packet sent attempts to remote destinations. Packets, either by Network Profiler or by Triggered Probing, would be sent only if there were previous sent attempts.

Although the forgoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims.

Thus, many modifications and variations may be made in the techniques and structures described and illustrated herein without departing from the spirit and scope of the present claims. Accordingly, it should be understood that the methods and apparatus described herein are illustrative only and are not limiting upon the scope of the claims.

The invention claimed is:

1. A method of determining network connectivity comprising:
  determining whether a request is for web connectivity or IP connectivity;
  wherein, if the request is for IP connectivity, then (a) executing network profiling to determine the number of hops (Hfar) to an edge of an ISP network that provides the IP connectivity, (b) executing a passive analyzer that reviews incoming packets to determine network connectivity, (c) executing triggered probing of a network to determine network connectivity, and (d) executing direct probing of a network to determine network connectivity;
  wherein, if the request is for web connectivity, then
    (e) determining if a web proxy is present in the network and, if a web proxy is not present in the network, then (i) executing network profiling to determine Hfar, (ii) executing a passive analyzer that reviews incoming packets to determine network connectivity, (iii) executing triggered probing of a network to determine network connectivity, and (iv) executing direct probing of a network to determine network connectivity,
(f) if a web proxy is present in the network, then (1) executing a passive analyzer that reviews incoming packets to determine network connectivity, (2) executing triggered probing of a network to determine network connectivity, and (3) executing direct probing of a network to determine network connectivity;
wherein executing web proxy detection further comprises (a1) storing a list of a pool of seed URL hosted on the Internet along with the IP addresses of the hosts, (a2) performing an HTTP GET for three or more seed URLs randomly selected from the pool, (a3) determining whether all the HTTP GETs responses match the expected content;
wherein, if the determination of whether all the HTTP GETs responses match the expected content is yes, then executing web proxy detection also includes checking for the IP addresses for a plurality of responses and checking the TTLs for the responses;
wherein, if the IP addresses and TTLs are as expected, then executing web proxy detection also includes determining that proxy servers are present, performing name resolutions for a plurality of names, and determining whether any name successfully resolves but the results are different from the expected result;
wherein, if the determination is yes, then detecting the presence of DNS spoofing, determining that web connectivity is not be present, and invoking the passive analyzer;
wherein, if the determination of whether all the HTTP GETs responses match the expected content is no, then determining that a web proxy is present, checking IP addresses of responses, and checking TTLs of responses;
wherein, if addresses are the same for all responses, then also calculating a hop count to proxy server;
wherein, if IP addresses are different than expected website addresses, then also determining the IP address of the proxy server;
indicating being connected to the Internet when packets are received from an ISP's backbone;
picking a plurality of seed host names from a pool of geographically distributed Internet sites;
performing DNS lookups to obtain IPv4 addresses for the plurality of seed host names;
selecting one IPv4 address for each host; and
for each of the plurality of seed hosts, sending two UDP (or TCP) packets with the TTL 2-tuple <Hfar−1, Hfar> using the port designated port for traceroute.

2. The method of claim 1, wherein executing network profiling for IPv4 comprises sending several packets with initial TTL set to different values around Hfar and any responses to those packets indicates internet connectivity.

3. The method of claim 2, further comprising indicating the ISP backbone has been reached when packets are received from geographically separate locations on separate paths.

4. The method of claim 1, further comprising using the presence of inbound Internet connectivity to indicate full network connectivity.

5. The method of claim 4, further comprising
comparing the source of the received packets to a list of sources known to be further than the Internet backbone; and
indicating Internet connectivity if a packet is received from a source of the list of sources known to be further than the Internet backbone.

* * * * *